(12) United States Patent
Kamphuis et al.

(10) Patent No.: US 9,372,964 B2
(45) Date of Patent: Jun. 21, 2016

(54) SOFTWARE LICENSE CONTROL

(75) Inventors: Robert Engelbert Hubert Kamphuis, Ojakkala (FI); Saku Juhani Oja, Espoo (FI); Sami Petteri Levijoki, Nummela (FI); Jin Albert Zhang, Espoo (FI)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 14/001,542

(22) PCT Filed: Mar. 21, 2011

(86) PCT No.: PCT/EP2011/054185
§ 371 (c)(1),
(2), (4) Date: Aug. 26, 2013

(87) PCT Pub. No.: WO2012/126506
PCT Pub. Date: Sep. 27, 2012

(65) Prior Publication Data
US 2013/0340092 A1    Dec. 19, 2013

(51) Int. Cl.
*G06F 21/10* (2013.01)
*G06F 21/00* (2013.01)

(52) U.S. Cl.
CPC .............. *G06F 21/10* (2013.01); *G06F 21/105* (2013.01); *G06F 21/00* (2013.01)

(58) Field of Classification Search
USPC ...................... 726/27, 5; 713/176; 705/59, 52; 709/231
See application file for complete search history.

(56) References Cited

U.S. PATENT DOCUMENTS

| | | | |
|---|---|---|---|
| 2008/0098465 A1 | 4/2008 | Ramakrishna et al. | |
| 2010/0293619 A1* | 11/2010 | Hayami | 726/27 |
| 2011/0047624 A1* | 2/2011 | Vedantam et al. | 726/26 |

FOREIGN PATENT DOCUMENTS

| | | |
|---|---|---|
| CN | 1996332 A | 7/2007 |
| CN | 101710377 A | 5/2010 |
| CN | 101916415 A | 12/2010 |
| EP | 2 251 814 A2 | 11/2010 |
| EP | 2251814 A2 | 11/2010 |
| JP | 2000357086 A | 12/2000 |
| JP | 2003186562 A | 7/2003 |
| JP | 2005250597 A | 9/2005 |
| JP | 2006018815 A | 1/2006 |
| JP | 2007293618 A | 11/2007 |
| JP | 2010015410 A | 1/2010 |
| JP | 2010267009 A | 11/2010 |

OTHER PUBLICATIONS

Flexera Software: "License Administration Guide," Flexera.com, Jul. 31, 2010, pp. 1-202, XP002638738.
VMware: "Changing or keeping a UUID for a Moved Virtual Machine," VMware knowledge base, Jan. 27, 2011, XP002638739, pp. 1-4.

(Continued)

*Primary Examiner* — Jeffrey Pwu
*Assistant Examiner* — Samuel Ambaye
(74) *Attorney, Agent, or Firm* — Squire Patton Boggs (US) LLP

(57) ABSTRACT

A system for software license control is described that is particular useful for use in a virtualized system, such as a cloud computing system. A module can be made available for use within the virtualized network, wherein a license fee is payable for use of the module. The module includes a license file that can be located wherever it is required. In addition, a central license file is provided at an administration node. The central license file is configured such that it can only be operated from that administration node, thereby preventing the copying of that file. The license file operating in the virtual network communicates with the central license file. The central license file controls the use of the licensed module.

17 Claims, 5 Drawing Sheets

(56) References Cited

OTHER PUBLICATIONS

International Search Report and Written Opinion dated Jun. 29, 2011 corresponding to International Patent Application No. PCT/EP2011/054185.

Japanese Office Action Notification of Reason for Rejection application No. 2013-556976 dated Aug. 6, 2014.
Office Action issued Apr. 23, 2015, issued in corresponding CN Patent Application No. 201180069413.X, English translation.

* cited by examiner

SOFTWARE LICENSE CONTROL

The invention is related to the control of software licenses. In particular, the invention is related to the control of software licenses in flexible systems, such as cloud computing systems.

It is common practice for software companies to license the use of their software on a limited basis. For example, the specific combinations of features available for use may be limited, or a limit on the number of transactions-per-second may be imposed. In many cases, vendors want to enforce such limitations so that end customers cannot use more than has been purchased. This can be achieved, for example, using license files, which are often protected from modification via e.g. signatures and encryption technologies.

One known method requires a license file to be installed and used from a specific hardware server, thereby preventing the copying of license files to multiple parallel systems. This may be achieved by linking the license file to the serial number of the server, but other methods are, of course, possible. Preventing the copying of license files prevents a copy of a license file from being used to gain access to more features and services than are covered by a single instance of a particular license.

In recent times, new technologies, often referred to as "virtualization" have been used, wherein software modules can be deployed on a virtual platform. One of the key benefits for this solution is that it is very flexible and allows customers to move applications around from one server to another without down-time, and enables higher utilisations of the platform by potentially making platforms available to multiple parties. One deployment model works by in effect 'renting' computing resources from third parties, resulting in cost savings due to the reduction in the need for investment in infrastructure. This form of virtualization is often called "cloud computing".

A side effect of the trend towards virtualization and cloud computing is that applications are intended to be freely movable between servers as the mix of capacity needed per product changes over time. The desire for such flexibility from both suppliers and consumers of computing resources runs counter to the use of the sort of tight hardware-locking license control described above. Thus, taking advantage of the flexibility promised by cloud computing and other forms of virtualization typically requires the disabling of such hardware locking mechanisms. Of course, without such control mechanisms, customers may be able to make use of computing infrastructure and software without paying the appropriate license fees.

A similar problem can occur with embedded third party software, such as databases. These embedded software components are often licensed per CPU, or per server, for usage as part of another application. Such a charging scheme does not fit well with the virtualization and cloud computing models outlined above.

Thus, the increased use of cloud computing and other virtual implementations makes it difficult to implement traditional licensing models and control mechanisms of the form outlined above.

In response to this problem, many virtual deployments simply allow software to be run without hardware-based license control. An alternative approach is simply to not support virtual deployments at all. Yet another approach is to charge in different ways for the use of software products; for example, a so-called "enterprise license" can be provided in which a customer pays a significant fee for unrestricted use of a particular software product. Although these approaches address some of the issues outlined above, none addresses the underlying problems.

Accordingly, there remains a need for an arrangement that allows computing systems to be provided in a flexible manner (e.g. on an apparently anonymous servers in a cloud computing implementation) whilst enabling elements of such systems (such as the applications runs on such anonymous servers) to be licensed in a flexible but controlled manner.

The present invention seeks to address at least some of the problems outlined above.

The present invention provides a method (e.g. a method of license control) comprising: receiving (e.g. at a local management module—typically a software module) a request for access to a feature (or combination of features) for which a license is required (the request may be received from an application, typically an application that requires access to that feature or combination of features); consulting a first license file (typically a local license file) to determine whether or not to provide provisional access to the feature; and communicating with an administration node, wherein the administration node includes a second license file, wherein the second license file (often a central license file) is configured such that it can only operate when installed at said administration node and wherein the administration node is configured to use said second license file to determine whether or not access to said feature is granted. In one embodiment of the invention, the first (local) license file is not limited to any particular hardware node. Accordingly, the location of the local license file can be freely changed. The method may further comprise receiving information from said administration node indicating whether or not access to said feature is granted. Alternatively, or in addition, the method may further comprise receiving an indication from the administration node indicating that access to said feature is not granted.

In some forms of the invention, the first license file is protected against modification.

In some forms of the invention, the first license file is identified by a unique identifier (such as a pseudo-hardware identifier).

The present invention also provides an apparatus (such as a local management module) comprising: a first input for receiving a request for access to a feature (or combination of features) for which a license is required (the request may be received from an application, such as an application that requires access to that feature or combination of features); a first processor configured to consult a first license file (typically a local license file) to determine whether or not to provide provisional access to the feature; a first output for communicating with an administration node (e.g. on a periodic basis), wherein the administration node includes a second license file, wherein the second license file (often a central license file) is configured such that it can only operate when installed at said administration node and wherein the administration node is configured to use said second license file to determine whether or not access to said feature is granted; and a second input for receiving a response from said administration node. The said second input may receive information from said administration node indicating whether or not access to said feature is granted. Alternatively, or in addition, an indication may be received from the second license file indicating that access to said feature is not granted.

In some forms of the invention, communicating with said administration node may occur on a periodic basis (e.g. once per minute). This is not, however, essential to all forms of the invention. For example, communication with said administration node may happen at times that are not periodic, for example such communication may occur on demand.

In some forms of the invention, a record of the usage of a licensed feature is made at said administration node (e.g. for charging purposes).

Access to said feature may be denied (e.g. by said administration node/second license file) in the event that a predefined access limit has been reached. Alternatively, or in addition, access to said feature may be denied (e.g. by said administration node/second license file) in the event that similar requests have been received from different sources. In one embodiment of the invention, access to said feature is denied in the event that requests for access to said feature are received from more than a predetermined number of sources or from a source other than a predefined set of sources; thus, several first license files can each gain access to a feature using said second license file, but that number of first license files (and/or the identity of those first license files) may be limited.

The present invention also provides a method (e.g. of license control) comprising: receiving, at an administration node, a request (often from a local management module—typically a software module) for access to a feature (or combination of features) for which a license is required (the request may be received from an application, typically an application that requires access to that feature or combination of features); consulting a second license file to determine whether or not access to the feature should be provided, wherein said license file is configured such that it can only operate when installed at a defined hardware node (such as part of a defined administrative server—the first controller has no such limitation); and providing a response to the request (typically depending on the content of said second license file). The said request may identifies a first license file (e.g. using a unique identifier, such as a pseudo-hardware identifier) used to determine whether or not to grant provisional access to the feature.

The present invention yet further provides an apparatus (such as an administration node) comprising: a first input for receiving a request (often from a local management module, typically a software module) for access to a feature (or combination of features) for which a license is required (the request may be received from an application, such as an application that requires access to that feature or combination of features); a second processor configured to consult a second license file to determine whether or not access to the feature should be provided, wherein said license file is configured such that it can only operate when installed at a defined hardware node (such as part of a defined administrative server—the first controller has no such limitation); and a first output for providing a response to the request (typically depending on the result of said consultation with the second license file). In some forms of the invention, a record of the usage of a licensed feature is made at said administration node (e.g. for charging purposes). In some forms of the invention, access to said feature is denied (e.g. by said administration node/second license file) in the event that a predefined access limit has been reached. Alternatively, or in addition, access to said feature may be denied (e.g. by said administration node/ second license file) in the event that similar requests have been received from different sources. In one embodiment of the invention, access to said feature is denied in the event that requests for access to said feature are received from more than a predetermined number of sources or from a source other than a predefined set of sources; thus, several first license files can each gain access to a feature using said second license file, but that number of first license files (and/or the identity of those first license files) is limited.

The present invention also provides a system comprising one or more local management modules and an administration node, wherein: the or each local management module comprises: a first input for receiving a request for access to a feature for which a license is required; a first processor configured to consult a first license file to determine whether or not to provide provisional access to the feature; a first output for communicating with the administration node; and a second input for receiving a response from said administration node; and the administration node comprises: a first input for receiving a request from at least one of said one or more local management software modules for access to a feature for which a license is required; a second processor configured to consult a second license file to determine whether or not access to the feature should be provided, wherein said license file is configured such that it can only operate when installed at a defined hardware node; and a first output for providing the said response to said request. The or each local management module may additionally include one or more of the features outlined above. Similarly, the administration node may include one or more of the features outlined above.

The present invention further provides a method comprising: receiving, at local management module, a first request for access to a feature for which a license is required; consulting a first license file to determine whether or not to provide provisional access to the feature; sending a second request from the local management module to an administration node for access to a feature for which a license is required, wherein the administration node includes a second license file, wherein the second license file is configured such that it can only operate when installed at said administration node and wherein the administration node is configured to use said second license file to determine whether or not access to said feature should be granted, wherein the method further comprises: consulting the second license file to determine whether or not access to the feature should be provided; and providing a response to the second request to the local management module.

The present invention also provide a computer program comprising: code (or some other means) for receiving a request for access to a feature for which a license is required; code (or some other means) for consulting a first license file to determine whether or not to provide provisional access to the feature; and code (or some other means) for communicating with an administration node, wherein the administration node includes a second license file, wherein the second license file is configured such that it can only operate when installed at said administration node and wherein the administration node is configured to use said second license file to determine whether or not access to said feature is granted. The computer program may be a computer program product comprising a computer-readable medium bearing computer program code embodied therein for use with a computer.

The present invention further provides a computer program comprising: code (or some other means) for receiving, at an administration node, a request for access to a feature for which a license is required; code (or some other means) for consulting a second license file to determine whether or not access to the feature should be provided, wherein said license file is configured such that it can only operate when installed at a defined hardware node; and code (or some other means) for providing a response to the request. The computer program may be a computer program product comprising a computer-readable medium bearing computer program code embodied therein for use with a computer.

Exemplary embodiments of the invention are described below, by way of example only, with reference to the following numbered drawings.

Figure 1:
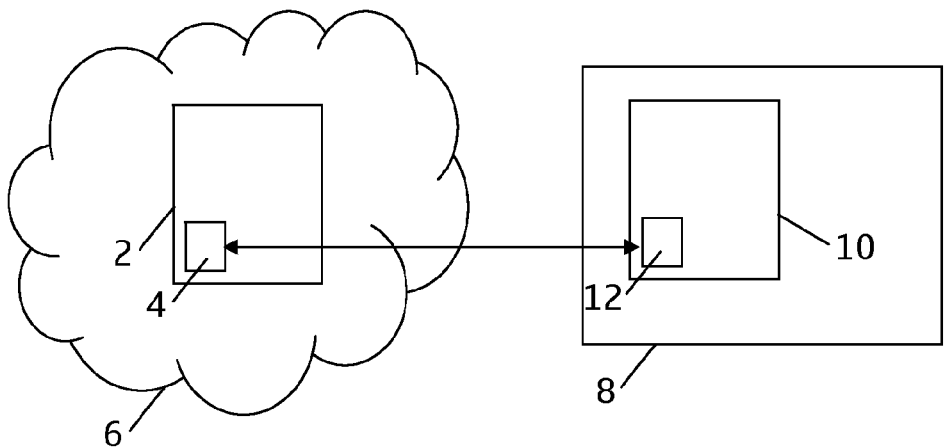
FIG. 1 is a block diagram of a system in accordance with an aspect of the present invention.

FIG. 1 is a block diagram of a system, indicated generally by the reference numeral 1, in accordance with an aspect of the invention. The system 1 comprises a virtual machine 2, a license file 4 that forms part of the virtual machine 2, a network 6, such as a cloud, an administration node 8 and a central licensing server (CLS) 10 that forms part of the administration node. The central licensing server 10 includes a license file 12 that forms a pair with the license file 4 of the virtual machine 2.

The virtual machine 2 includes local license management software that makes use of information stored in the license file 4 to determine how that software should operate. The license file 4 may take the form of a configuration file that is protected against modification, for example using cryptographic methods, using encryption/decryption via a shared secret or using a digital signature.

The system 1 provides a multi-stage approach for addressing the problems described above.

The first stage is formed by the license file 4 deployed inside the virtual machine 2 running application software in the network 6. The local license management software, in combination with the license file 4, controls the usage of features and capacities of the application(s) provided by the virtual machine 2. The license file 4 is not locked to any hardware node and thus can be used by the virtual machine 2, regardless of where that virtual machine is running.

The second stage consists of a license control method deployed in the administration node 8 that is used to manage the virtual machine 2 (or at least the application(s) being run on the virtual machine 2). The license file 12 that forms a pair with the license file 4 is stored on the CLS 10. Importantly, the license file 12 is locked to the relevant hardware node (e.g. the administration node 8). The license file 12 is not used by the individual applications directly, but by the central licensing server 10.

The third stage is formed by a check via a remote connection between stage one and stage two of the multi-stage approach, i.e. between the license file 4 and the license file 12 under the control of the central licensing server 10. The check may be periodic, but this is not essential to all forms of the invention. For example, the check may be continuous, or may be made on demand.

Figure 2:
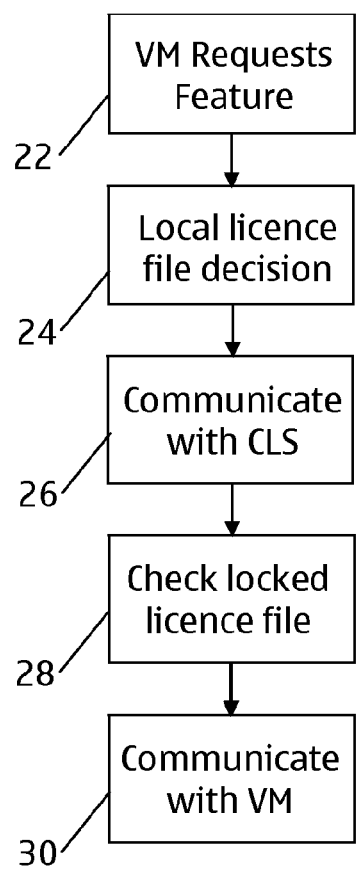
FIG. 2 is a flow chart showing an algorithm in accordance with an aspect of the present invention.

FIG. 2 is a flow chart showing an algorithm, indicated generally by the reference numeral 20, in accordance with an aspect of the present invention. The algorithm 20 starts at step 22, where the application software provided by the virtual machine 2 contains custom logic that requests access to a particular feature or combination of features. A decision in response to the request is made by the local management software, after consulting the local license file 4 (step 24 of the algorithm 20). Thus, the content of the local license file 4 controls what the software inside the virtual machine 2 is able to do.

At step 26 of the algorithm 20, the local management software of the virtual machine 2 uses the remote connection to the central licensing server 10 to periodically (e.g. every minute or so) communicate with the license file 12 at the central licensing server 10. This request includes a unique identifier which identifies the license file 4 and may optionally include additional information e.g. the type of license or the type of product.

In response to the message received at step 26, the central licensing server 10 uses the unique identifier received in the request from the local license server 4 to determine whether the license identified by the unique identifier is valid (step 28 of the algorithm 20). If so, the central licensing server 10 determines whether the license request should be granted (for example based on the nature of the request and any requests that have been made in the past). Thus, the unique identifier is used to link the license file 4 at the virtual machine 2 and the license file 12 at the central licensing server 10. The central licensing server may need to update its records (for example for billing purposes).

The algorithm 20 then moves to step 30 where the central licensing server 10 communicates with the local license management software. By way of example, the central licensing server may confirm that the requested features can be used. Alternatively, the central licensing server may indicate that the license does not allow the requested features to be used (for example because a limit of use has been reached). The step 30 may be optional. For example, if the central licensing server 10 deems that the local license file can proceed, it may not contact the license file 4 (i.e. contact may only be made to prevent an action being approved by the license file 4 that would breach a license condition).

The system 1 provides flexibility, since the license file 4 can be deployed wherever it is required. Indeed, the license file 4 can be moved, if necessary. At the same time, the license file 12 is fixed to the administration server 8. In the event that multiple copies of the license file 4 are made in an attempt to access more licensed features than have been paid for, the license file 12 will either detect the additional instances of the license file 4 or will detect that more feature access requests have been requested than paid for and will instruct the license file 4 to reject requests that the license file 4 would otherwise have granted.

In the system 1, a single license file 4 is provided as part of a single virtual machine 2 within the network 6. Of course, many virtual machines may be provided within the network, each of which may have a license file in communication with a license file pair at the central licensing server 10.

Figure 3:
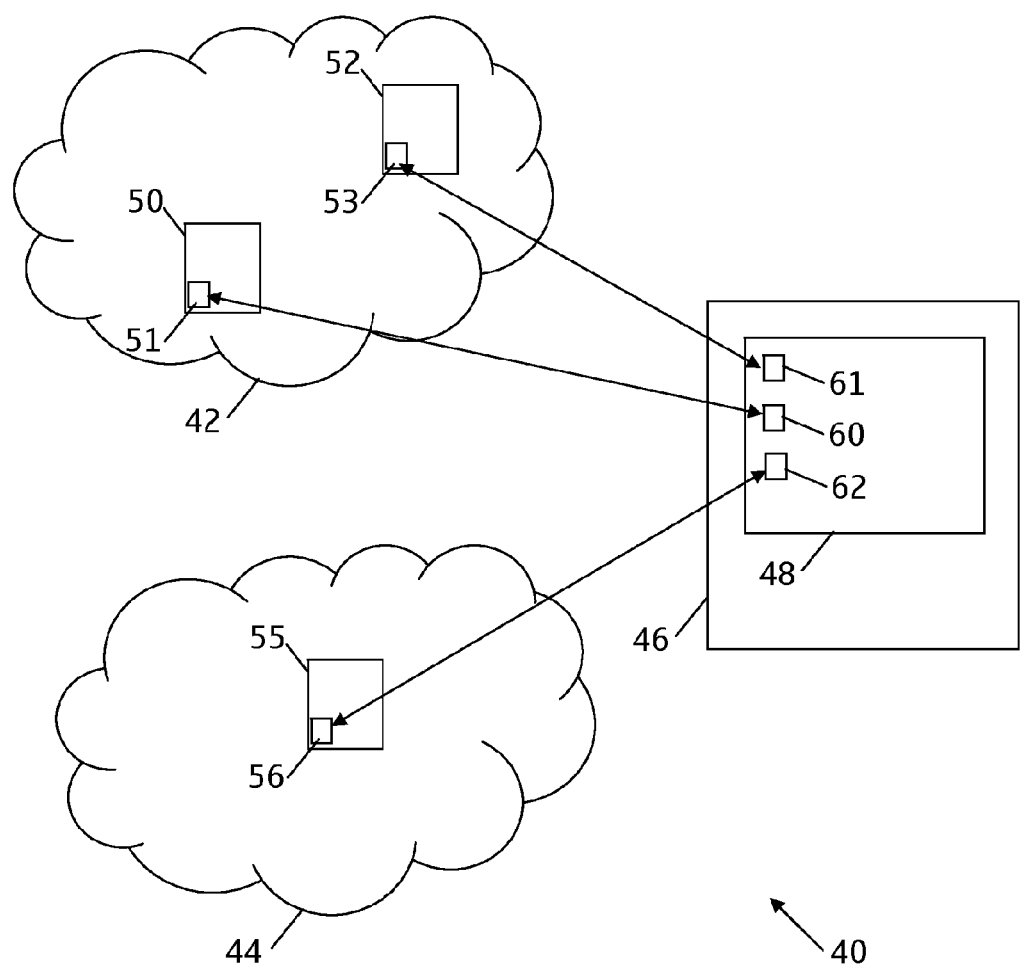
FIG. 3 is a block diagram of a system in accordance with an aspect of the present invention.

FIG. 3 is a block diagram of a system, indicated generally by the reference numeral 40, in accordance with an aspect of the present invention in which not only does a network have multiple virtual machines in communication with a single central licensing server, but multiple networks are provided.

The system 40 comprises a first network (or cloud) 42, a second network (or cloud) 44 and an administration node 46.

The first network 42 comprises a first virtual machine 50 and a second virtual machine 52. The first virtual machine 50 includes a first license file 51. The second virtual machine 52 includes a second license file 53. The second network 44 comprises a third virtual machine 55. The third virtual machine 55 includes a third license file 56.

The administration node 46 comprises a central licensing server 48. The central licensing server 48 includes a first license file 60, a second license file 61 and a third license file 62. The first, second and third license files of the central licensing server are paired with the first 51, second 53 and third 56 license files respectively of the virtual machines described above.

The first license file 51 of the first virtual machine 50 is paired with the first license file 60 of the central licensing server 46. The first license file 51 of the first virtual machine operates as described above with reference to the flow chart 20. Thus, application software provided by the first virtual machine 50 may request access to a particular feature or combination of features for which a license is required. In response to such a request, the first license file 51 of the first virtual machine first makes a decision as to whether access should be granted (step 24 of the algorithm 20). The first license file 51 periodically makes contact with the first license file 60 at the central licensing server 48. The first license file 60 at the central license server 48 may communicate with the first license file 51 at the first virtual machine 50 as required, for example to instruct the license file 51 to refuse all additional license access requests from the application run by the first virtual machine 50.

The second license file 53 of the second virtual machine operates in a similar manner to the first license file 51. Of course, the license file 53 communicates with the second license file 61 of the central licensing server 48. Similarly, the third license file 56 of the third virtual machine 55 works in a similar manner to the licenses files 51 and 53, but communicates with the third license file 62 of the central licensing server 48.

As shown in FIG. 3, a number of virtual machines can be provided, with each of those virtual machines having a local license file in communication with the central licensing server 48. The virtual machines are flexible and can, in principle, be located anywhere. The virtual machines can be moved, with the only restriction being that they need to be able to communicate with the central licensing server 48. As described above, more than one network can be provided. A virtual machine can readily be moved from one network to another.

The nature of the networks 42 and 44 is not important to the present invention. By way of example, the network 42 may be a private cloud, such as a cloud that is available to a limited group of users. For example, the cloud 42 may be an internal cloud provided to the employees of a particular company. By way of example, the network 44 may be a public (or semi-public cloud) to which anyone can gain access.

Thus, the system 40 provides a great deal of flexibility, by enabling virtual machines (and the license files of those virtual machines) to be deployed as required, and even moved from one network to another. At the same time, the system 40 provides security by providing a central point (or anchor) to which all licensing requests must be communicated. The central point (the license files of the central licensing server) can be used to control access to licensed features and to ensure the users are not able to access more features than are provided for by the relevant license.

Figure 4:
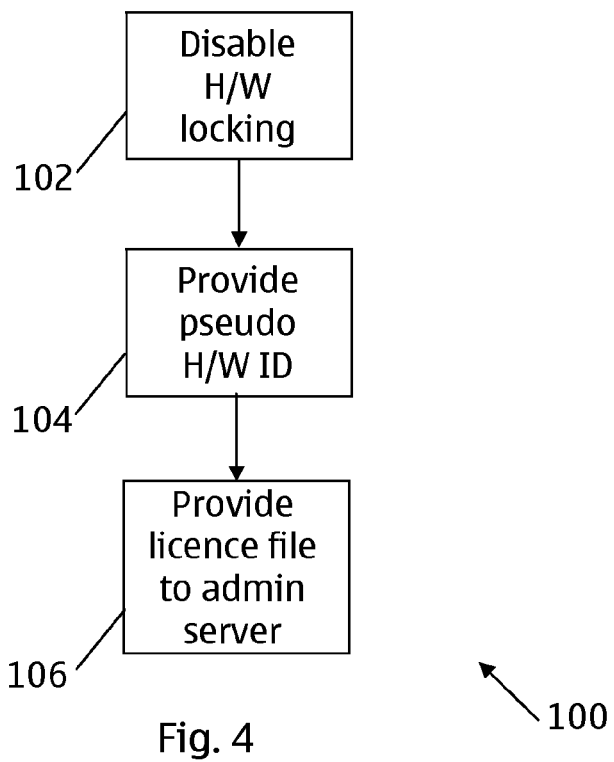
FIG. 4 is a flow chart showing an algorithm in accordance with an aspect of the present invention.

The invention can be implemented by building on existing solutions. By way of example, FIG. 4 is a flow chart, indicated generally by the reference numeral 100, showing how an existing solution can be modified to implement the present invention.

The algorithm 100 starts at step 102, where a virtual module is forced to change its licensing control by disabling the hardware locking feature of the module. For example, some known virtual modules have an "optional" flag for virtualisation deployment that can be set. Disabling the hardware locking features enables the virtual machine to be deployed anywhere (in accordance with the present invention).

Next, at step 104, the license file of the virtual module is provided with a pseudo-hardware identifier. This pseudo-hardware identifier is the unique identifier discussed above with respect to the algorithm 20.

Finally, at step 106, the required license file is generated and provided to the central licensing server of the system in which the virtual module is to be deployed. The license file of the central licensing server will recognise the pseudo-hardware identifier assigned to the virtual module.

Once set-up as shown in the algorithm 100, the virtual module can communicate with the relevant central licensing server and the central licensing server can identify the virtual module. The licensed functionality of the virtual module can therefore be unlocked under the control of the central licensing authority, in accordance with the principles of the present invention.

It should be noted that the algorithm 100 is not the only method of implementing the present invention. An advantage of the algorithm 100 is that it re-uses many features of existing licensing control mechanisms.

Figure 5:
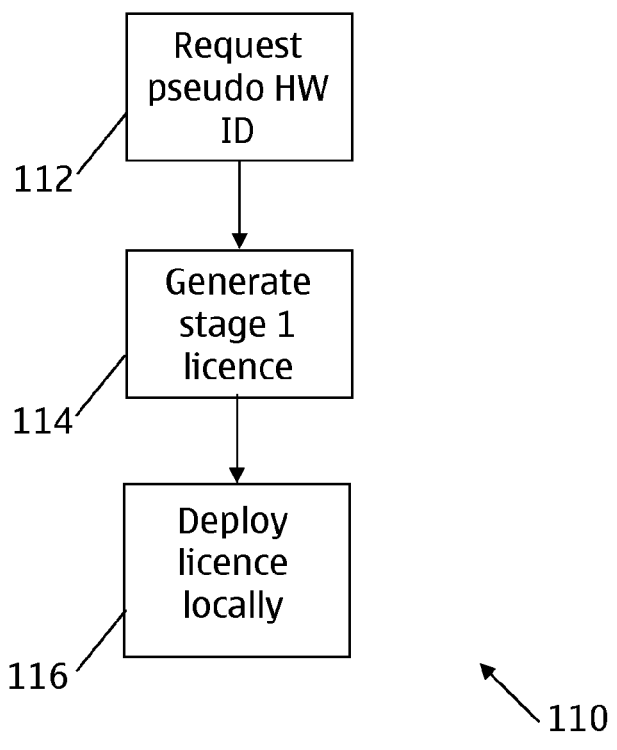
FIG. 5 is a flow chart showing an algorithm in accordance with an aspect of the present invention.

FIG. 5 is a flow chart of an algorithm, indicated generally by the reference numeral 110, in accordance with an aspect of the present invention. The algorithm 110 enables additional features or capacity to be provided to a virtual module that has already been deployed. For example, the algorithm 100 can be used to implement a licensing-updating arrangement that a customer has agreed to.

The algorithm 110 starts at step 112 where the pseudo-hardware identity of the virtual module requiring upgraded functionality (or, indeed, downgraded or simply changed functionality) is requested. Next, at step 114, a new local license (such as a new license file 4) is generated and sent to the virtual module. Finally, at step 116, the newly generated license file is deployed at the virtual machine.

In the embodiments of the invention described above, the virtual modules have been provided with one or more license files that communicate with a corresponding license file at a central licensing server. This is not essential to all forms of the invention. For example, the functionality of the license file at the virtual module could be moved to the central licensing server. Such an arrangement is shown in FIG. 6.

Figure 6:
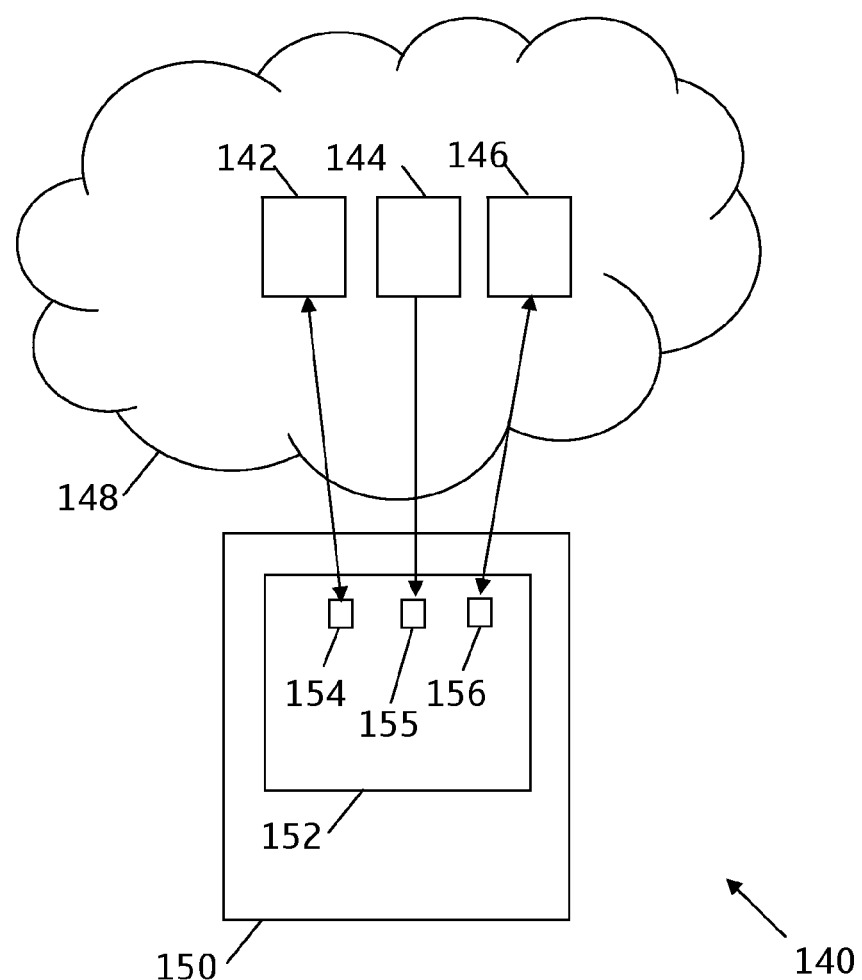
FIG. 6 is a block diagram of a system in accordance with an aspect of the present invention.

FIG. 6 is a block diagram of a system, indicated generally by the reference numeral 140, in accordance with an aspect of the present invention. The system 140 comprises a network 148 (e.g. cloud) and an administration node 150.

The network 148 comprises a first virtual machine 142, a second virtual machine 144 and a third virtual machine 146. The administration node 150 comprises a central licensing server 152. The central licensing server 152 includes a first license file 154, a second license file 155 and a third license file 156. The first 154, second 155 and third 156 license files provide license functionality for the first 142, second 144 and third 146 virtual machines respectively. In the system 140, the license files 154, 155 and 156 are locked to the hardware element 150.

Consider the scenario in which an application at the virtual machine 142 wants to access a service for which a license is required. In the system 140, the virtual machine 142 communicates with the license file 154 to determine whether access can be granted. The requested service will only be unlocked once permission is granted by the license file 154.

In the system 140, the virtual machines 142, 144 and 146 can be freely configured to activate any feature and capacity, but these configurations are only really enabled after the appropriate license file (i.e. license file 154, 155 or 156)

allows this after the request over the interface between the network 148 and the administration node 150. A key element of the invention remains: the virtual machines are not locked to any hardware, but are linked via an interface to a license file that is locked to a hardware element.

It should also be noted that it is not essential to all forms of the present invention that the central licensing server is truly "central". The concepts of the present invention can be applied where each virtual machine links to a separate licensing server which is locked to a hardware element. In other words, it is not essential to consolidate all of the licensing servers at the same location (i.e. as part of a central server).

Figure 7:
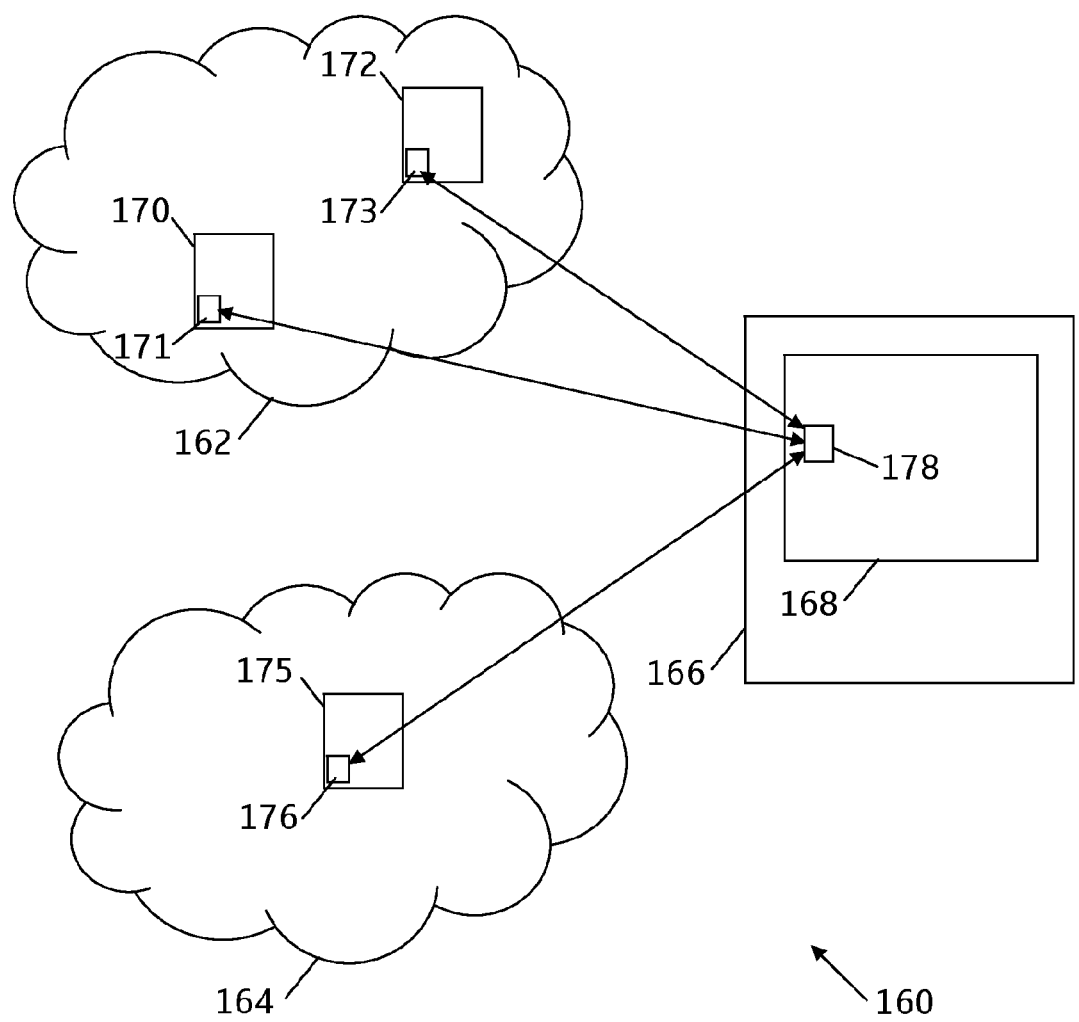
FIG. 7 is a block diagram of a system in accordance with an aspect of the present invention.

In the embodiments of the invention described above, each license file of said central licensing server has been linked with one (and only one) license file of a virtual machine. This is not essential to all forms of the invention. For example, a license file at the central licensing server may serve a plurality of local license files. By way of example, FIG. 7 is a block diagram of a system, indicated generally by the reference numeral 160, in accordance with an aspect of the present invention.

The system 160 comprises a first network (or cloud) 162, a second network (or cloud) 164 and an administration node 166.

The first network 162 comprises a first virtual machine 170 and a second virtual machine 172. The first virtual machine 170 includes a first license file 171. The second virtual machine 172 includes a second license file 173. The second network 164 comprises a third virtual machine 175. The third virtual machine 175 includes a third license file 176.

The administration node 166 comprises a central licensing server 168. The central licensing server 168 includes a license file 178. The license file 178 of the central licensing server 168 is paired with the first 171, second 173 and third 176 license files of the virtual machines described above.

The first license file 171 of the first virtual machine 170 operates as described above with reference to the flow chart 20 (and is therefore similar to the license files 51, 53 and 56 described above with reference to FIG. 3). Thus, application software provided by the first virtual machine 170 may request access to a particular feature or combination of features for which a license is required. In response to such a request, the first license file 171 of the first virtual machine first makes a decision as to whether access should be granted (step 24 of the algorithm 20). The first license file 171 periodically makes contact with the license file 178 at the central licensing server 168. The license file 178 at the central license server 168 may communicate with the first license file 171 at the first virtual machine 170 as required, for example to instruct the license file 171 to refuse all additional license access requests from the application run by the first virtual machine 170.

The second license file 173 of the second virtual machine operates in a similar manner to the first license file 171 and also communicates with the license file 178 of the central licensing server 168. Similarly, the third license file 176 of the third virtual machine 175 works in a similar manner to the licenses files 171 and 173 and communicates with the license file 178 of the central licensing server 168.

The license file 178 may be configured such that it can communicate with a maximum number of local license files. If so, once that maximum has been reached, any further access requests will be refused by the central licensing server. Alternatively, the license file 178 may be configured to allow requests from a number of predefined local license files (such as the license files 171, 173 and 176) and no other local license files. In a further alternative, the license file 178 may allow all requests from local license file up to a predefined functionality limit. For example, the license file 178 may allow a defined number of service access requests in a given time period and refuse any requests beyond that limit.

As with the system 40, the virtual machines in the system 160 are flexible and can, in principle, be located anywhere. The virtual machines can be moved, with the only restriction being that they need to be able to communicate with the central licensing server 168.

The embodiments of the invention described above are illustrative rather than restrictive. It will be apparent to those skilled in the art that the above devices and methods may incorporate a number of modifications without departing from the general scope of the invention. It is intended to include all such modifications within the scope of the invention insofar as they fall within the scope of the appended claims.

The invention claimed is:

1. A method in a cloud computing environment, the method comprising:
running an application software in the cloud computing environment by a virtual machine in a guest operating system, the virtual machine includes a first license file and a local license management software in the same guest operating system, the first license file being identified by a unique identifier and not being locked to any hardware;
controlling usage of features and capacities of the application software provided by the virtual machine by the local license management software in combination with the first license file;
receiving from the application software a request for access to a feature for which a license is required;
consulting, by the local license management software, the first license file to determine whether or not to provide provisional access to the feature; and
communicating, by the local license management software, with an administration node, the communicating including at least sending a request including at least the unique identifier to the administration node, wherein the administration node includes a second license file that is locked to the administration node and paired with the first license file of the virtual machine by means of the unique identifier, wherein the second license file is configured such that it can only operate when installed at said administration node and wherein the administration node is configured to use said second license file to determine whether or not access to said feature should be granted, wherein access to said feature is denied in the event that a predefined access limit has been reached.

2. A method as claimed in claim 1, further comprising receiving information from said administration node indicating whether or not access to said feature should be granted.

3. A method as claimed in claim 1, wherein the first license file is protected against modification.

4. A method as claimed in claim 1, wherein communicating with said administration node occurs on a periodic basis or on demand.

5. A method as claimed in claim 1, further comprising: receiving from the administrative node a changed first license file; and deploying the changed first license file at the virtual machine.

6. A method as claimed in claim 1, wherein a record of the usage of a licensed feature is made at said administration node.

7. A method as claimed in claim 1, wherein access to said feature is denied in the event that requests for access to said feature have been received from different sources.

8. A method comprising: receiving, at an administration node, from a local license management software of a virtual machine operating in a cloud computing environment in another node, a request for access to a feature for which a license is required, the request including a unique identifier of a first license file that is not being locked to any hardware and that is in a same guest operating system as the local license management software, used in the other node to determine whether or not to grant provisional access to the feature to an application run by the virtual machine;
consulting a second license file that is locked to the administration node and paired with the first license file of the virtual machine by means of the unique identifier to determine whether or not access to the feature should be provided, wherein said second license file is configured such that it can only operate when installed at a defined hardware node; and
providing a response to the request,
wherein access to said feature is denied in the event that a predefined access limit has been reached.

9. A method as claimed in claim 8, wherein a record of the usage of a licensed feature is made at said administration node.

10. A method as claimed in claim 8, wherein access to said feature is denied in the event that requests for access to said feature have been received from different sources.

11. An apparatus comprising: a virtual machine in a guest operating system for running an application software in a cloud computing environment, the virtual machine including a first license file and a local license management software in the same guest operating system, the first license file being identified by a unique identifier and not being locked to any hardware;
a first input for receiving from the application software a request for access to a feature for which a license is required;
a first processor configured to consult the first license file to determine whether or not to provide provisional access to the feature;
a first output for communicating with an administration node, the communicating including at least sending a request including at least the unique identifier to the administration node, wherein the administration node includes a second license file that is locked to the administration node and paired with the first license file of the virtual machine by means of the unique identifier, wherein the second license file is configured such that it can only operate when installed at said administration node and wherein the administration node is configured to use said second license file to determine whether or not access to said feature should be granted; and
a second input for receiving a response from said administration node,
wherein said first processor is configured to deny access to said feature in the event that a predefined access limit has been reached.

12. An apparatus as claimed in claim 11, wherein said second input receives information from said administration node indicating whether or not access to said feature should be granted.

13. An apparatus comprising:
a first input for receiving over a remote connection, from a local license management software of a virtual machine operating in a cloud computing environment, a request for access to a feature for which a license is required, the request including a unique identifier of a remote first license file that is not being locked to any hardware and that is in a same guest operating system as the local license management software, used to determine whether or not to grant provisional access to the feature;
a second processor configured to consult a second license file that is locked to a defined hardware node and paired with the remote first license file by means of the unique identifier to determine whether or not access to the feature should be provided, wherein said second license file is configured such that it can only operate when installed at the defined hardware node; and
a first output for providing a response to the request,
wherein said second processor is configured to deny access to said feature in the event that a predefined access limit has been reached.

14. An apparatus as claimed in claim 13, wherein said second processor is configured to deny access to said feature in the event that requests for access to said feature have been received from different sources.

15. A system comprising:
one or more local management modules, each local management module configured to control usage of features and capacities of an application software running in a cloud computing environment and provided by a virtual machine in a guest operating system of the local management module;
one or more local management modules, each local management module configured to control usage of features and capacities of an application software running in a cloud computing environment and provided by a virtual machine in a guest operating system of the local management module;
one or more first license files, each first license file being identified by a unique identifier, included in a corresponding virtual machine, and not being locked to any hardware, wherein the first license file and the local management module are run in the same guest operating system; and
an administration node, wherein:
each local management module comprises: a first input for receiving from the application software a request for access to a feature for which a license is required; a first processor configured to consult the first license file to determine whether or not to provide provisional access to the feature;
a first output for communicating with the administration node, the communicating including at least sending a request including at least the unique identifier to the administration node; and a second input for receiving a response from said administration node; and
the administration node comprises:
one or more second license files, each second license file being locked to the administration node and paired with a corresponding first license file by means of the unique identifier, a first input for receiving the request from the local management software module for access to a feature for which a license is required, and a second processor configured to consult a second license file to determine whether or not access to the feature should be provided, wherein said second license file is configured such that it can only operate when installed at a defined hardware node; and a first output for providing the said response to said request, wherein access to said feature is denied in the event that a predefined access limit has been reached.

16. A computer program product embodied in a computer-readable non-transitory storage medium and comprising computer-readable code executable by a computer such that, when executing said code, said computer will control in combination with a first license file, usage of features and capacities of an application software provided by a virtual machine that includes the first license file and a local license management software, the computer program product comprising:
   code for receiving from the application software run in a cloud computing environment by the virtual machine in a guest operating system that includes the first license file and the local license management software in the same guest operating system, a request for access to a feature for which a license is required;
   code for consulting the first license file to determine whether or not to provide provisional access to the feature, the first license file being identified by a unique identifier and not being locked to any hardware; and
   code for communicating with an administration node, the communicating including at least sending a request including at least the unique identifier to the administration node,
   wherein the administration node includes a second license file that is locked to the administration node and paired with the first license file of the virtual machine by means of the unique identifier, wherein the second license file is configured such that it can only operate when installed at said administration node and wherein the administration node is configured to use said second license file to determine whether or not access to said feature should be granted,
   wherein access to said feature is denied in the event that a predefined access limit has been reached.

17. A computer program product embodied in a computer-readable non-statutory storage medium and comprising computer-readable code executable by a computer, the computer program product comprising:
   code for receiving, at an administration node, from a local license management software of a virtual machine operating in a cloud computing environment in a first node, a request for access to a feature for which a license is required by an application software run by the virtual machine, the request including a unique identifier of a first license file that is not being locked to any hardware and that is in a same guest operating system as the local license management software, of the virtual machine in the first node to determine whether or not to grant provisional access to the feature to the application software;
   code for consulting a second license file that is locked to the administration node and paired with the first license file by means of the unique identifier to determine whether or not access to the feature should be provided, wherein said license file is configured such that it can only operate when installed at a defined hardware node; and
   code for providing a response to the request,
   wherein access to said feature is denied in the event that a predefined access limit has been reached.

\* \* \* \* \*